US 6,575,196 B1

(12) United States Patent
Creswell

(10) Patent No.: US 6,575,196 B1
(45) Date of Patent: *Jun. 10, 2003

(54) VALVE CARTRIDGE WITH REDUCED TOLERANCE STACK-UP

(75) Inventor: Robert S. Creswell, Grand Rapids, MI (US)

(73) Assignee: Amerikam, Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/063,637

(22) Filed: May 7, 2002

Related U.S. Application Data

(63) Continuation-in-part of application No. 09/751,067, filed on Dec. 28, 2000, now Pat. No. 6,405,756.
(60) Provisional application No. 60/173,277, filed on Dec. 28, 1999.

(51) Int. Cl.[7] .............................................. F16K 11/078
(52) U.S. Cl. .............................. 137/625.46; 137/625.17; 137/454.6
(58) Field of Search ...................... 137/625.46, 625.17, 137/625.4, 454.5, 454.6

(56) References Cited

U.S. PATENT DOCUMENTS

| RE35,545 E | * | 7/1997 | Chrysler .............. 137/454.2 X |
| 6,405,756 B2 | * | 6/2002 | Creswell et al. ....... 137/625.17 |

* cited by examiner

Primary Examiner—Kevin Lee
(74) Attorney, Agent, or Firm—McGarry Bair PC

(57) ABSTRACT

A valve cartridge for controlling the flow of fluid between a fluid source and a fluid outlet has a valve body with a rotatable ceramic disk and fixed ceramic disk. A biasing element is disposed between the rotatable ceramic disk and the valve body for biasing the rotatable ceramic disk against the fixed ceramic disk. The fixed ceramic disk is additionally secured against the valve body to retain it independently of the biasing element, thus effectively removing the fixed ceramic disk from the stack up.

15 Claims, 15 Drawing Sheets

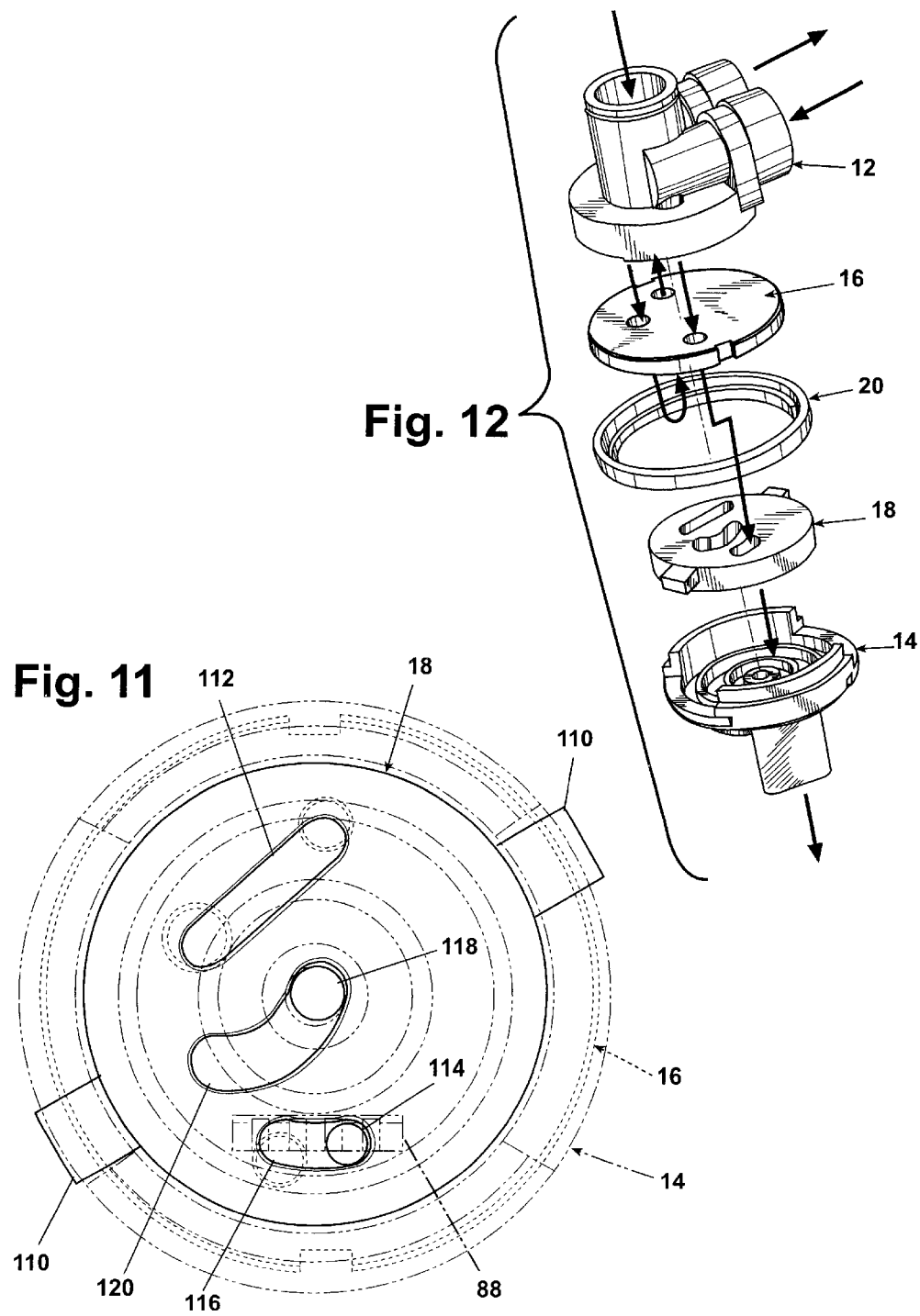

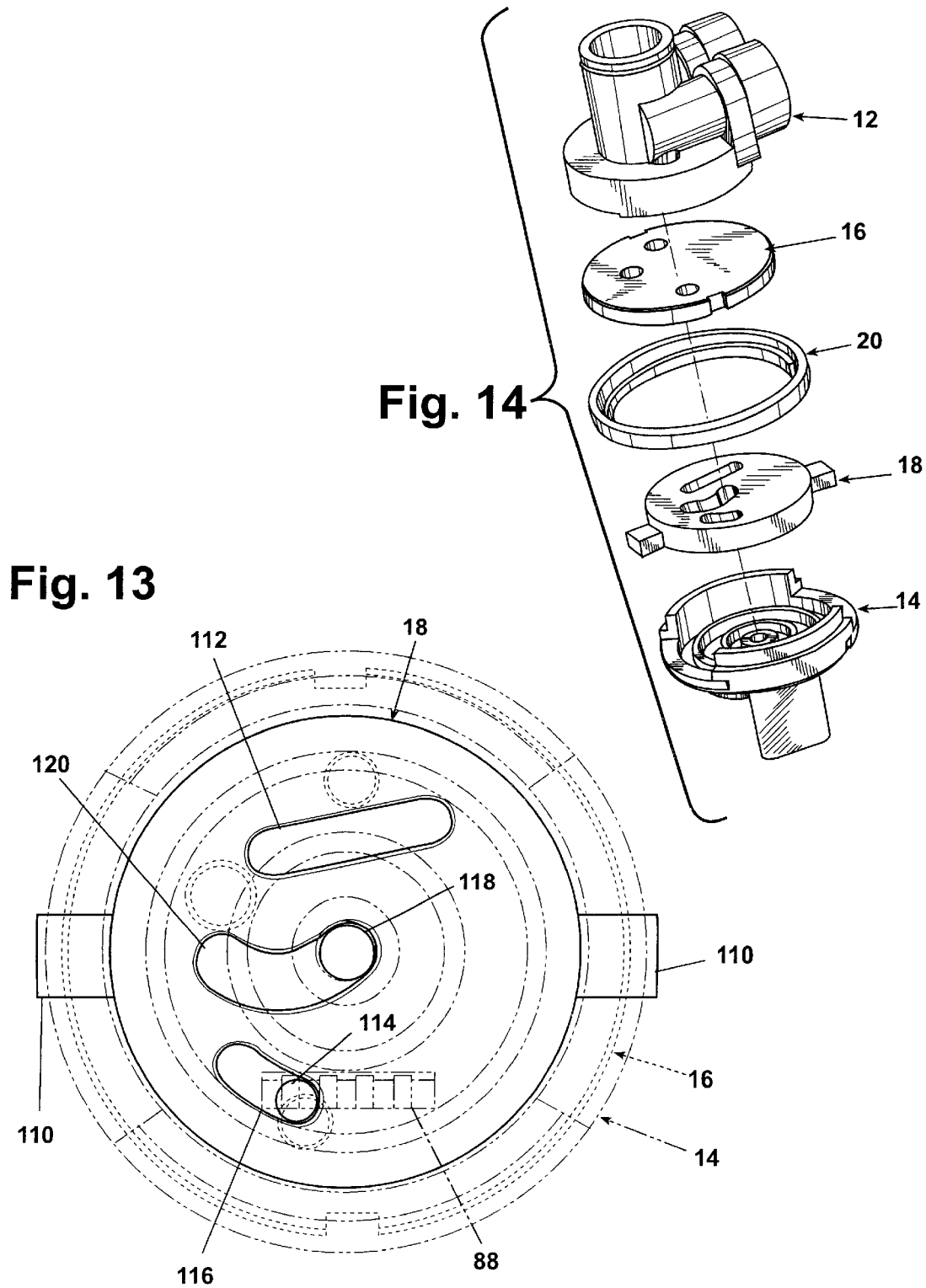

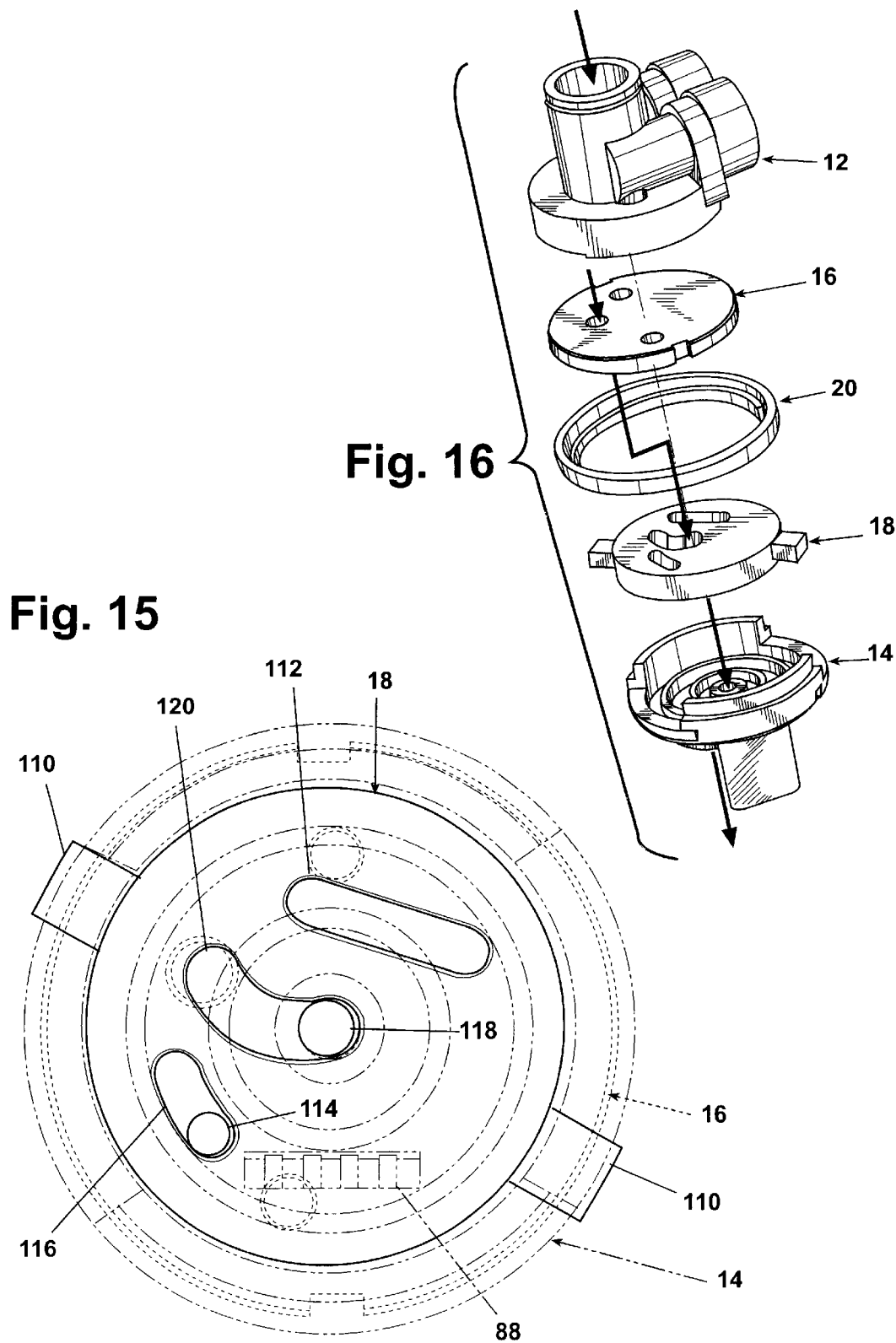

VALVE CARTRIDGE WITH REDUCED TOLERANCE STACK-UP

CROSS REFERENCE TO RELATED APPLICATIONS

This application is a continuation-in-part of U.S. application Ser. No. 09/751,067, filed Dec. 28, 2000 now U.S. Pat. No. 6,405,756, which claims priority on U.S. Provisional Application No. 60/173,277, filed Dec. 28, 1999.

BACKGROUND OF INVENTION

1. Field of the Invention

The invention relates to a valve cartridge comprising a rotating disk and a fixed disk, both configured to control the flow of fluid through the valve cartridge; and, more particularly, to the relative orientation of elements in the cartridge.

2. Description of the Related Art

Fluid valves using valve stacks are widely known and appear in various configurations, such as in-line valves, diverter valves, and hydrants, to name a few. A typical valve stack comprises a fixed disk and a rotating disk, both of which are configured to control the flow of fluid through the valve. Ceramic disks are preferred for their durability, wearability and lack of corrosion. Almost all ceramic valves comprise a "stack-up" that traditionally includes one or more O-rings, a fixed ceramic disk, a rotating ceramic disk, and a bearing in contact with the rotating ceramic disk. The stack-up is typically contained within a valve body, which defines the various inlets and outlets through which fluid can enter and exit the valve. The stack-up is typically under pressure (the stack-up pressure), along a given axis, which must be sufficient to prevent fluid from leaking between the interface of the disks while having a rotating force less than a predetermined value. Typically, the stack-up pressure is applied by securing a valve body holding the stack-up against a compression seat, or securing a retainer to the end of the valve body as disclosed in U.S. Pat. No. RE 35,545. The rotating force is the force that a user must supply to the handle of the valve to rotate the rotating disk with respect to the fixed disk to turn the valve through its various operating positions.

Obviously, the more elements introduced into the stack, the more tolerance errors appear that affect the stack-up pressure. This is particularly critical with the tolerances between the two ceramic disk elements. The two mating surfaces of the ceramic disks must be within close enough tolerances to effectively seal fluid from passing between them and allow fluid to pass only through the intended passages. However, once the stack-up pressure is applied, the two mating surfaces will sometimes actually stick together in a condition called "sticksion" wherein the two ceramics cannot be rotated relative to each other, even if the stack-up pressure is relieved. Obtaining and maintaining the proper stack-up pressure and accommodating tolerance errors in the stack-up are problems for all valves using a ceramic stack-up.

There is a need for a ceramic valve that reduces tolerance errors in the stack-up and provides better control over the stack-up pressure.

SUMMARY OF INVENTION

The invention relates to a valve cartridge for controlling the flow of fluid from a fluid source to a fluid outlet. In one aspect of the invention, the valve cartridge comprises a valve body having a longitudinal axis. A first disk is mounted to the valve body on the longitudinal axis such that it is axially and radially immovable relative to the valve body. A second disk is mounted to the valve body on the longitudinal axis and maintained in an axially facing relationship with the first disk. The second disk is rotatable relative to the valve body and to the first disk.

Each of the first and second disks is configured to permit fluid flow through the valve body when the second disk is in a first position, and to bar fluid flow through the valve body when the second disk is in a second position. A biasing element is disposed between the valve body and the second disk to bias the second disk against the first disk along the longitudinal axis.

Preferably, the valve cartridge further has a first annular shoulder and the first disk is held against the first annular shoulder by a retainer. Alternatively, the first disk is the retainer, simply secured against the first annular shoulder. The valve body can have a second annular shoulder against which the biasing element bears.

Preferably, the biasing element is a resilient seal, which typically would be an O-ring. In some embodiments, a stem will extend into the valve body and be operably connected to the rotatable disk to effect selective rotation of the second disk relative to the first disk. Preferably, the stem will extend axially from the valve body, but the stem can also extend radially from the valve body.

Typically, the disks will be ceramic disks and the hardness and size of the resilient seal is selected to control the biasing force applied to the second disk.

In another aspect of the invention, a conventional valve cartridge is of the type having a valve body with first and second ceramic disks disposed in facing relationship. The first ceramic disk is mounted to the body in a manner to prohibit rotatable movement of the first disk and the second disk is mounted to the valve body in a manner to permit rotatable movement relative to the valve body and to the first disk. The invention lies in the improvement wherein the first ceramic disk is fixed in the valve body to prohibit axial movement of the ceramic disk relative to the valve body and to the second ceramic disk.

Preferably, the valve cartridge further has a first annular shoulder and the first disk is held against the first annular shoulder by a retainer. Alternatively, the first disk is the retainer, simply secured against the first annular shoulder.

BRIEF DESCRIPTION OF DRAWINGS

In the drawings:

FIG. 11 is a partial assembly view of the fixed ceramic disk, rotating ceramic disk, and the lower valve body shown with the rotating ceramic disk in a filtered flow operational position wherein the water supply coming into the valve is diverted to a filter and returned to the valve body where it exits a spray opening;

FIG. 12 illustrates the water flow path through the valve body when the rotating ceramic disk is in the filtered flow position;

FIG. 13 illustrates the relative positions of the fixed ceramic disk, rotating ceramic disk, and lower valve body when the rotating ceramic disk is in a neutral position where the water input is not fluidly connected to either an external filter or directly passing through the valve;

FIG. 14 illustrates the fluid flow path through the valve when the rotating ceramic disk is in the neutral position;

FIG. 15 illustrates the relative positions of the fixed ceramic disk, rotating ceramic disk, and the lower valve body when the rotating ceramic disk is in a pass-through position where the fluid entering the valve passes directly through the valve body without being diverted to a filter and exiting the spout;

FIG. 16 illustrates the fluid flow path through the valve when the rotating ceramic disk is in the direct flow through position;

DETAILED DESCRIPTION

Figure 1:
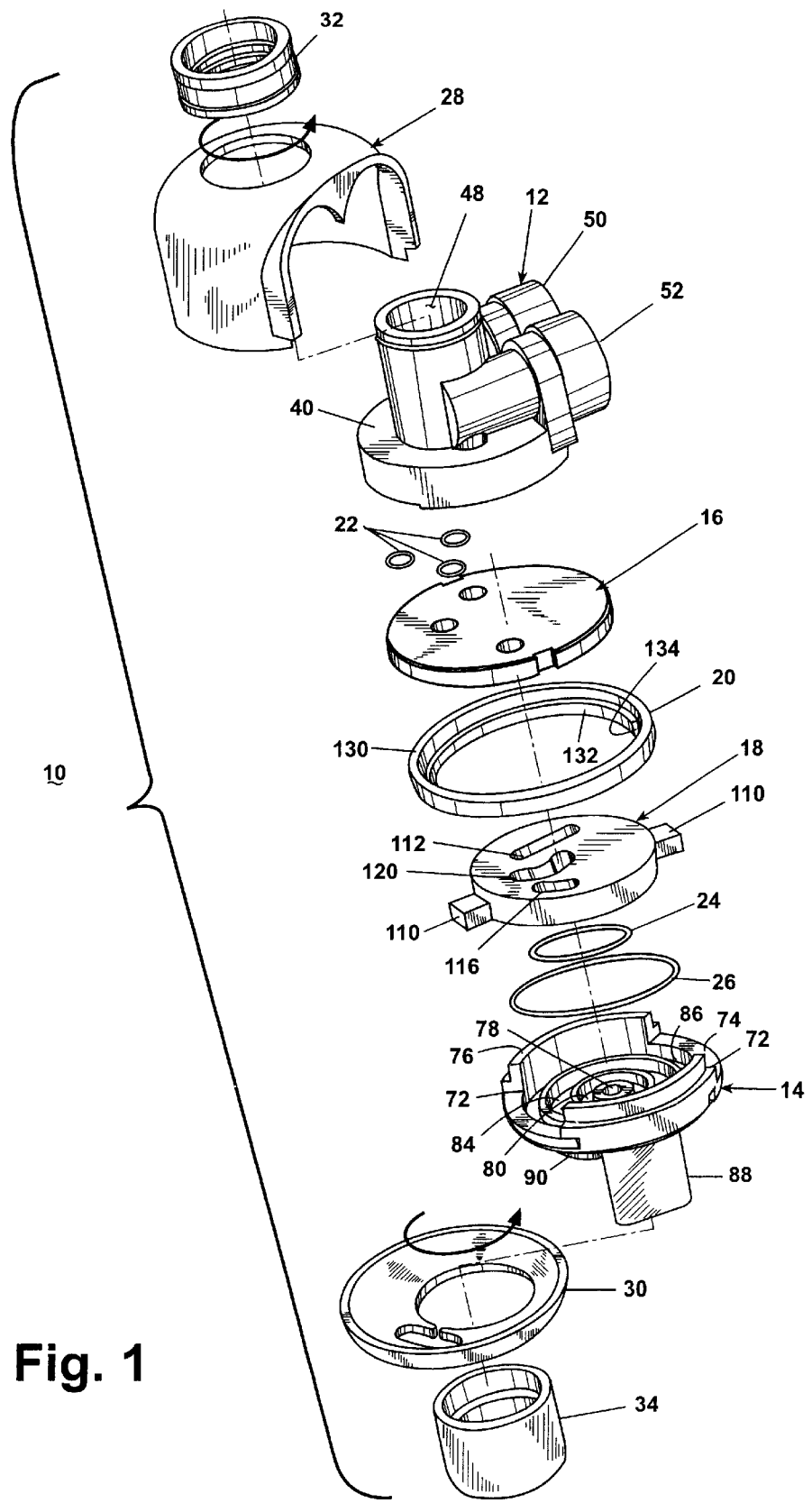
FIG. 1 is an exploded view of a two-position diverter valve comprising a ceramic stack-up in accordance with the invention.

FIG. 1 illustrates a valve cartridge 10 according to the invention. The valve cartridge 10 comprises an upper valve body portion 12 and a lower valve body portion 14 that together retain a fixed ceramic disk 16 and a rotating ceramic disk 18, whose rotational operation is controlled by a selection ring 20. O-rings 22 seal the fixed ceramic disk 16 with respect to the upper valve body portion 12. O-rings 24, 26 seal the rotating ceramic disk 18 with respect to the lower valve body portion 14.

An upper housing cover 28 and lower housing cover 30 are shaped to fit over the assembled upper valve body portion 12 and lower valve body portion 14, respectively, to provide an aesthetic cover for the upper and lower valve body portions 12, 14. Additionally, a collar 32 mounts to the upper cover 28 to aid in the connection of the valve to water supply. A nozzle 34 mounts to the lower body portion 14 to control the valve flow of fluid from the valve cartridge. The covers 28, 30, collar 32, and nozzle 34 are not germane to the function of the valve 10 and will not be described in greater detail.

Figure 2:
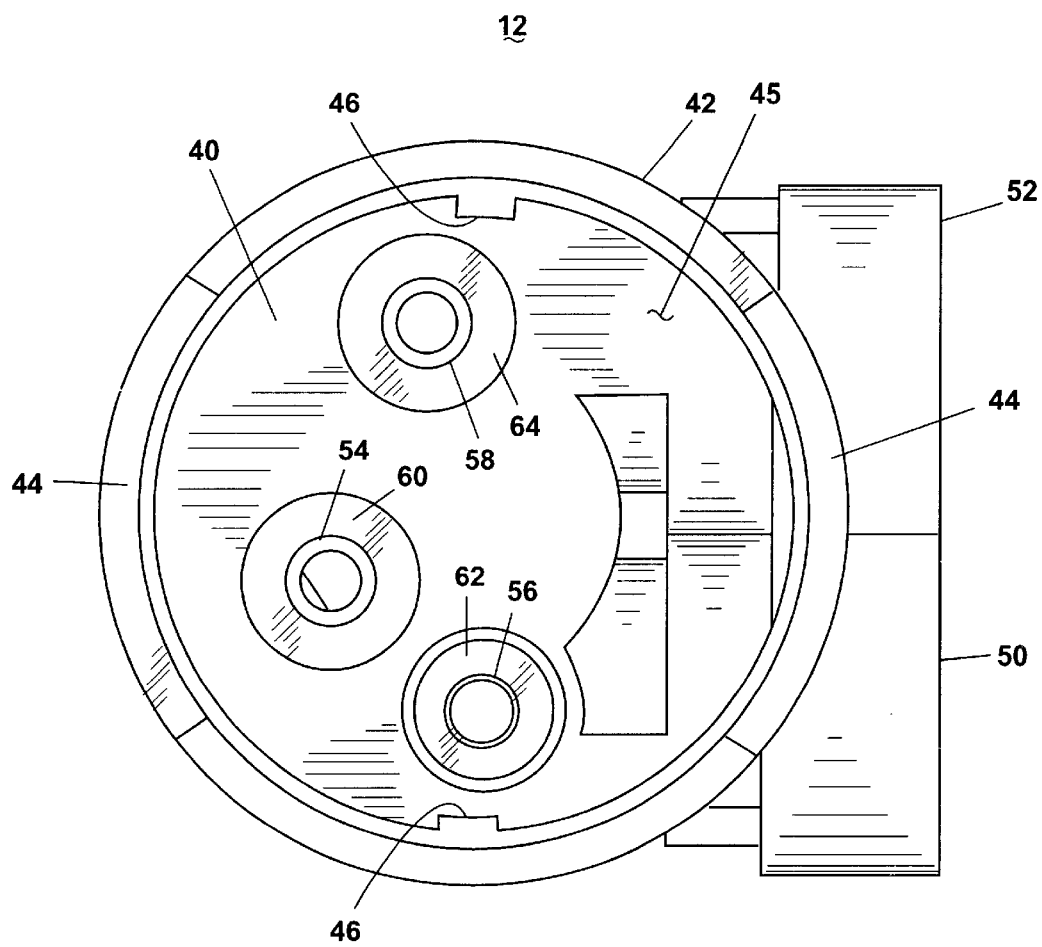
FIG. 2 is a bottom view of the upper valve body.

The various functional components of the valve cartridge 10 will now be described in greater detail. Referring to FIGS. 1 and 2, the upper valve body portion 12 comprises a top wall 40 having a depending annular wall 42, which is interrupted by opposing notches 44. The top wall 40 and the annular wall 42 define a recess 45 that forms a seat for the fixed disk 16. Keys 46 extend away from the annular wall 42. A tubular inlet 48 (FIG. 17) extends upwardly from the top wall 40 and defines an inlet chamber that is in fluid communication with a fluid source when the valve is assembled. A filter inlet 50 extends horizontally relative to the top wall 40. Similarly, a filter outlet 52 extends horizontally away from the top wall 40. The fluid inlet 46, filter inlet 50, and filter outlet 52 are all fluidly connected to the interior of the upper valve body portion 12 through pass-through openings 54, 56, 58, respectively, which are surrounded by annular channels 60, 62, and 64, which are sized to receive the O-rings 22.

Figure 3:
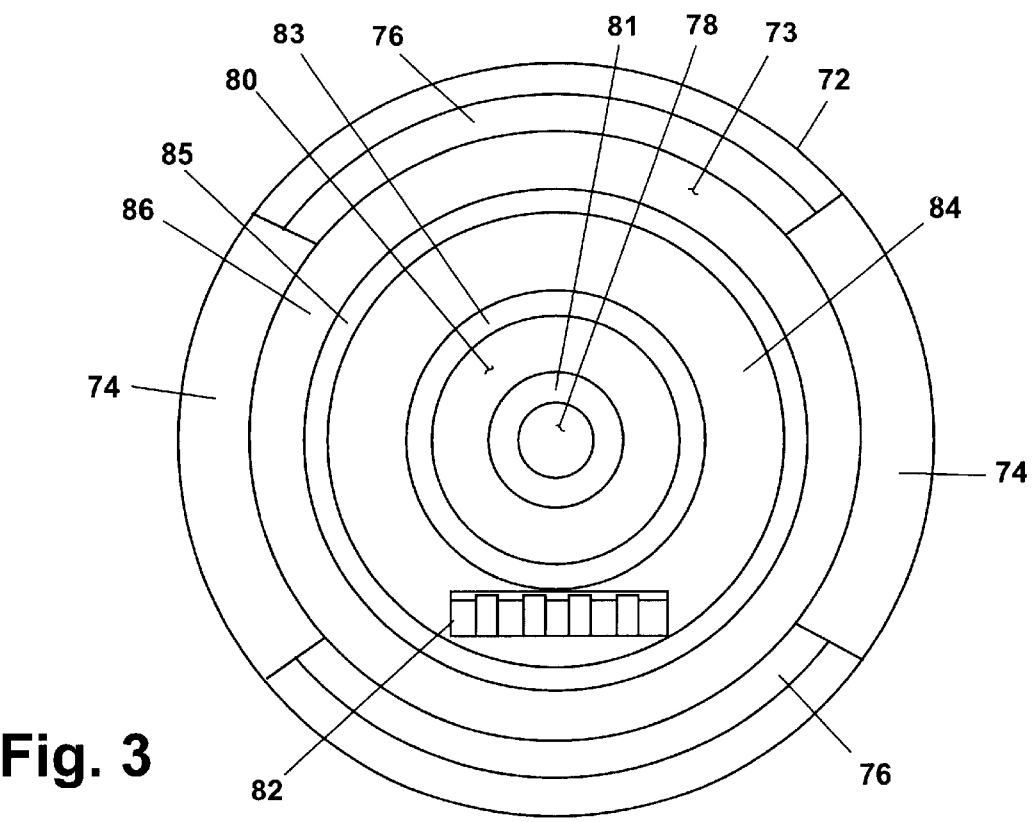
FIG. 3 is a top view of the lower valve body.
Figure 4:
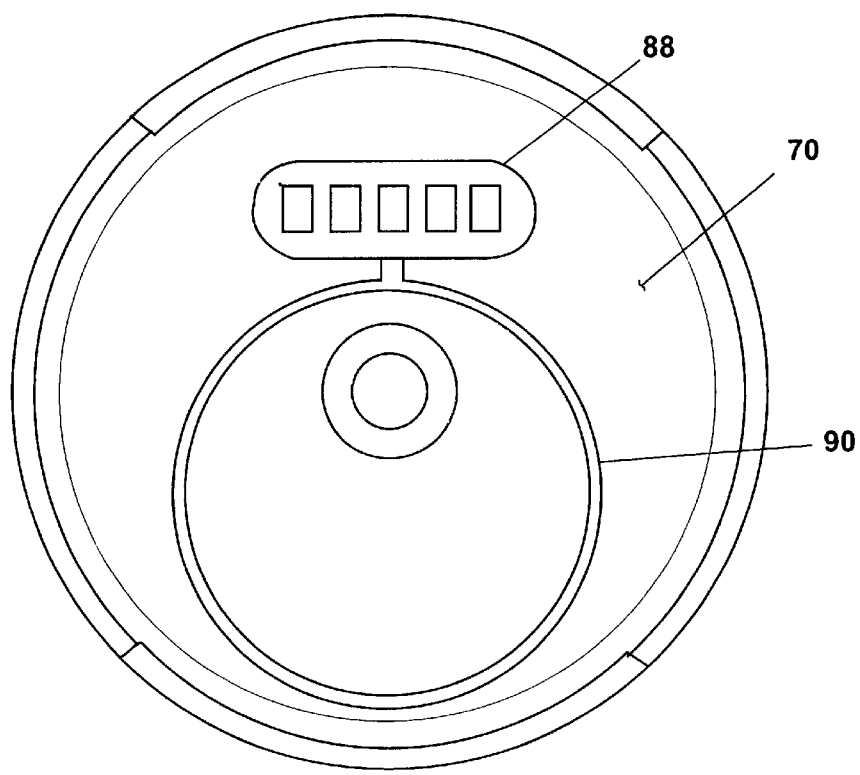
FIG. 4 is a bottom view of the lower valve body.

Referring to FIGS. 1, 3, and 4, the lower valve body portion 14 comprises a bottom wall 70, having an upwardly extending peripheral wall 72 interrupted by diametrically opposing notches 74. The inner surface of the top wall 70 and peripheral wall 72 form a recess 73 that forms a seat for the rotatable disk 18. A guide collar 76 extends upwardly from the peripheral wall 72 and has a slightly smaller radius than the peripheral wall 72.

A spout opening 78 is axially located in the bottom wall 70 and is surrounded by an O-ring groove 80. A filtered output opening 82 also passes through the bottom wall 70 and is located in a filtered fluid outlet channel 84 formed in the bottom wall 70, which is concentrically oriented with respect to the O-ring groove 80 in the spout opening 78. Also formed in the bottom wall 70 is an O-ring groove 86 concentrically located outside the filtered fluid outlet channel 84 and interior of the peripheral wall 72.

The O-ring groove 80, outlet channel 84, and O-ring groove 86 effectively define circular portions or rings 81, 83, and 85, respectively, in the bottom wall 70. The tops of these rings define the bottom wall upper surface and form a bearing against which the rotatable disk 18 abuts when the valve is assembled.

A filtered outlet spout 88 extends away from the exterior side of the bottom wall 70 along with a nozzle mounting collar 90. The nozzle-mounting collar 90 is threaded, permitting the nozzle 34 to be threaded onto the nozzle-mounting collar to mount the nozzle to the lower body portion.

Figure 5:
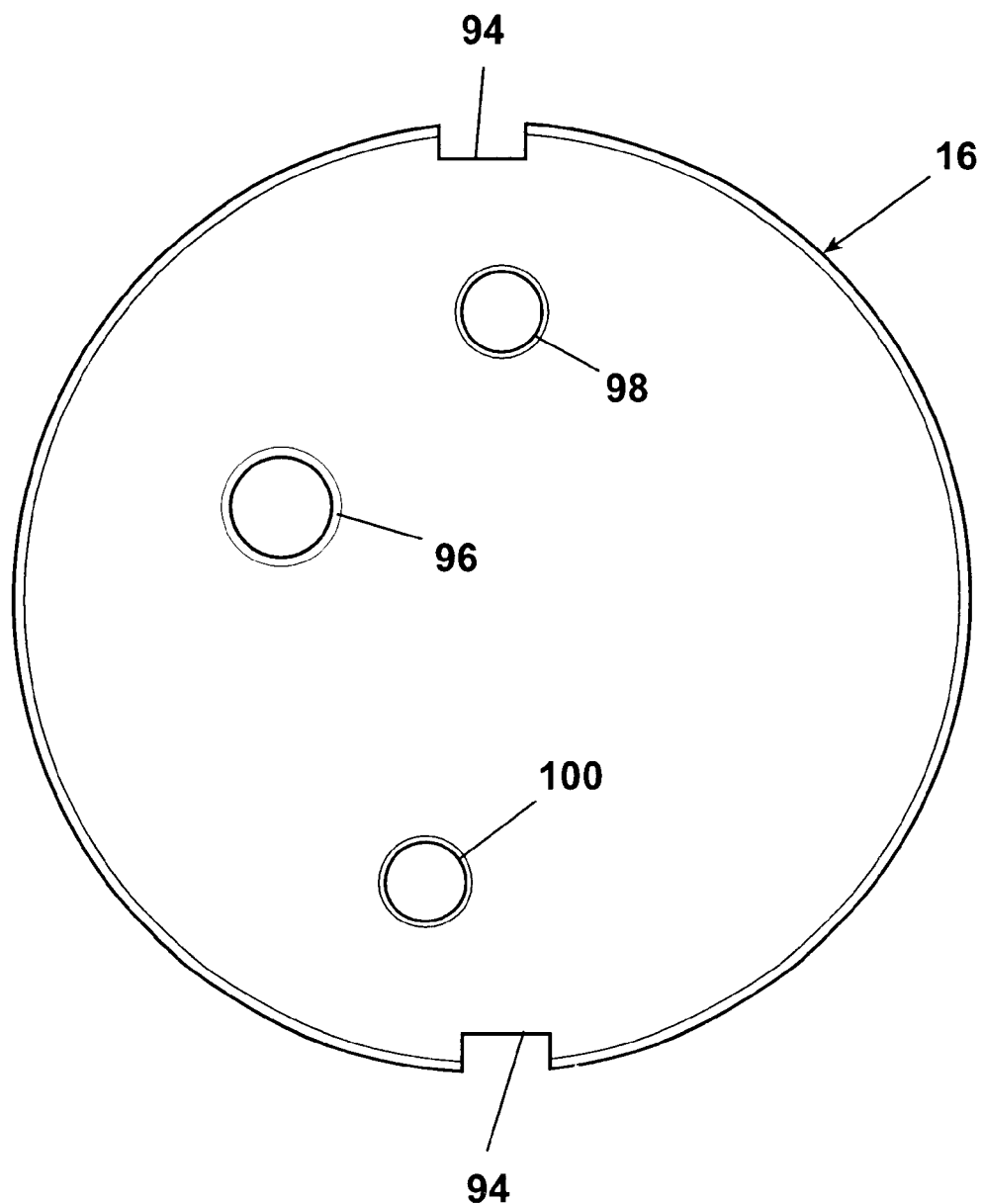
FIG. 5 is a top view of the fixed ceramic disk.

Referring to FIGS. 1, 2 and 5, the fixed ceramic disk 16 is generally circular with diametrically opposing keyholes 94 extending into the edge of the disk 16. The key holes 94 are sized to receive the keys 46 of the upper valve body portion 12 to fix the relative position of the fixed ceramic disk 16 with respect to the upper valve body portion 12. Multiple pass-through openings 96, 98, and 100 extend through the fixed ceramic disk 16. The pass-through openings 96, 98, and 100 correspond to the pass-through openings 54, 56, and 64 of the upper valve body portion 12. The fixed ceramic disk 16 is mounted to the upper valve body portion 12 and permits the flow of fluid from the pass-through openings of the upper valve body portion 12 to also a pass through the corresponding openings in the fixed ceramic disk 16.

Figure 6:
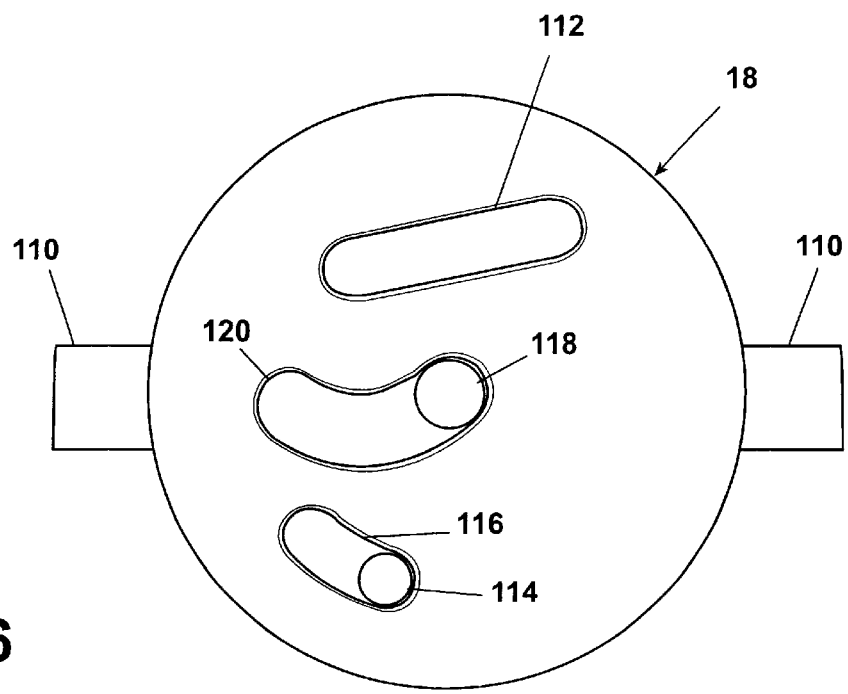
FIG. 6 is a top view of the rotating ceramic disk.
Figure 7:
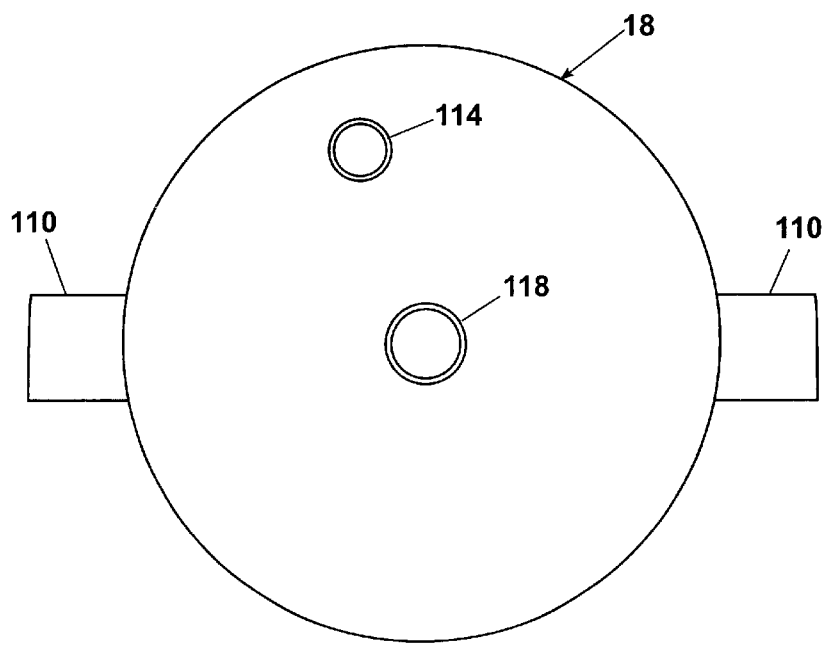
FIG. 7 is a bottom view of the rotating ceramic disk.

Referring to FIGS. 1, 6 and 7, the rotating ceramic disk 18 has a generally circular shape from which extend keys 110, which are sized to be received within the notches 44, 74 of the upper and lower valve body portions 12, 14 when the valve is assembled. The rotating ceramic disk is of a smaller diameter than the fixed ceramic disk. An elongated blind opening 112 is located on the upper surface of the rotating ceramic disk 18 and extends slightly radially outwardly from the center of the rotating ceramic disk 18. The elongated opening 112 is used to establish fluid communication between the fluid inlet opening 96 and filter inlet opening 98 of the fixed ceramic disk 18.

A pass-through opening 114 in combination with an arcuate blind opening portion 116 is also provided on the upper surface of the rotating ceramic disk 18. The pass-through opening 114 fluidly connects the filter outlet pass-through opening 100 of the fixed ceramic disk to the filtered fluid outlet channel 84 of the lower valve body portion 14. The corresponding arcuate blind portion 116 aids in keeping the pass-through opening 114 in fluid communication with the filter outlet pass-through opening 100 for a predetermined rotational range of the rotating ceramic disk 18.

A pass-through opening 118 in combination with an arcuate blind opening 120 is provided on the upper surface of the rotating ceramic disk 18 and establishes fluid communication between the fluid inlet pass-through opening 96 of the fixed ceramic disk 16 and the spout opening 78 of the lower valve body portion 14. The arcuate blind opening 120 is shaped to maintain fluid communication between the fluid source pass-through opening 96 of the fixed ceramic disk 16 and the pass-through opening 118 of the rotating ceramic disk 18 through a predetermined rotational range of the rotating ceramic disk 18.

Figure 8:
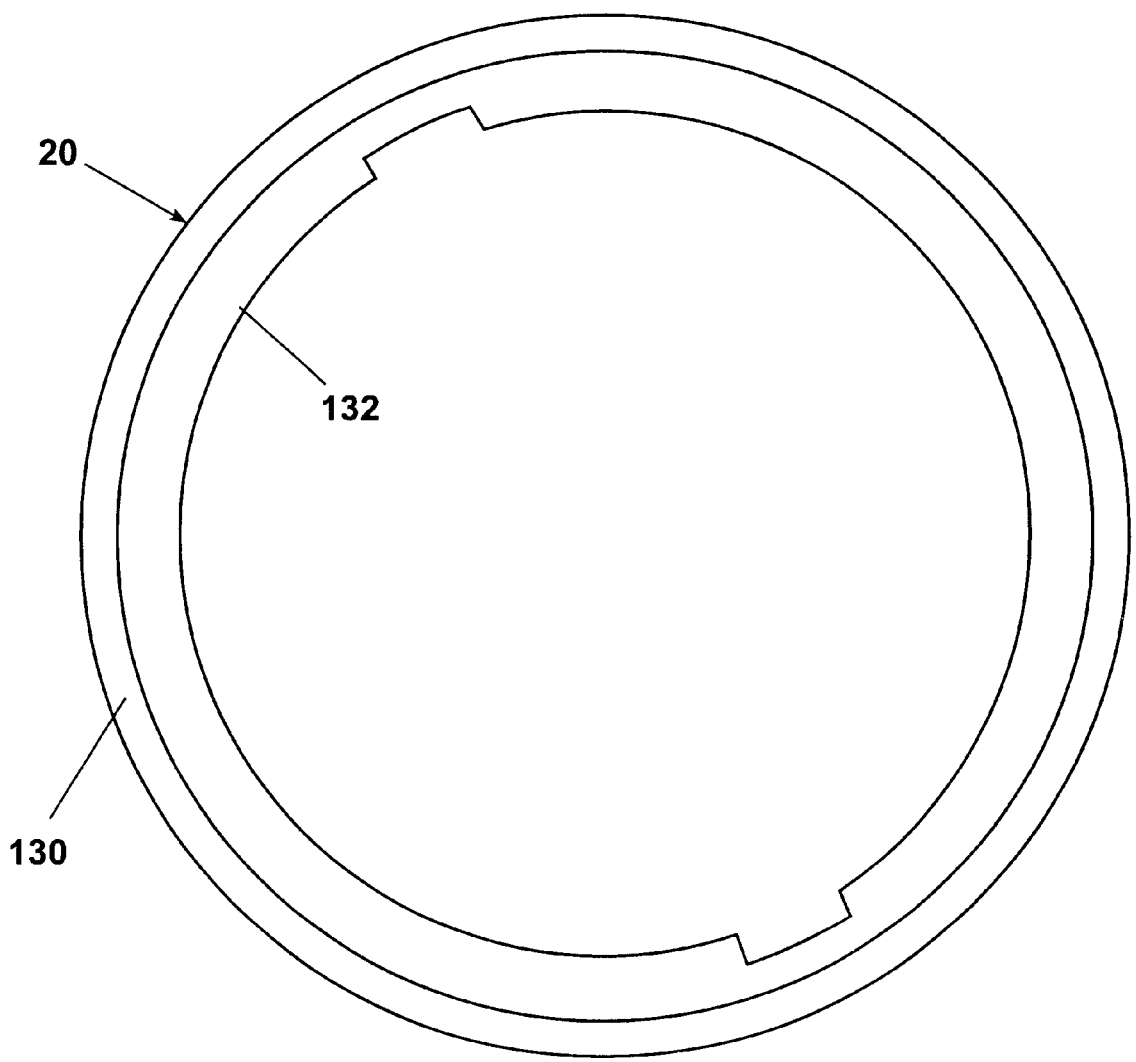
FIG. 8 is a bottom view of the selection ring.

Referring to FIGS. 1 and 8, the selection ring 20 comprises an outer collar 130 and an inwardly directed annular lip 132 in which are formed diametrically opposing key holes 134, sized to receive the keys 110 of the rotating ceramic disk 18 when the valve is assembled.

Figure 9:
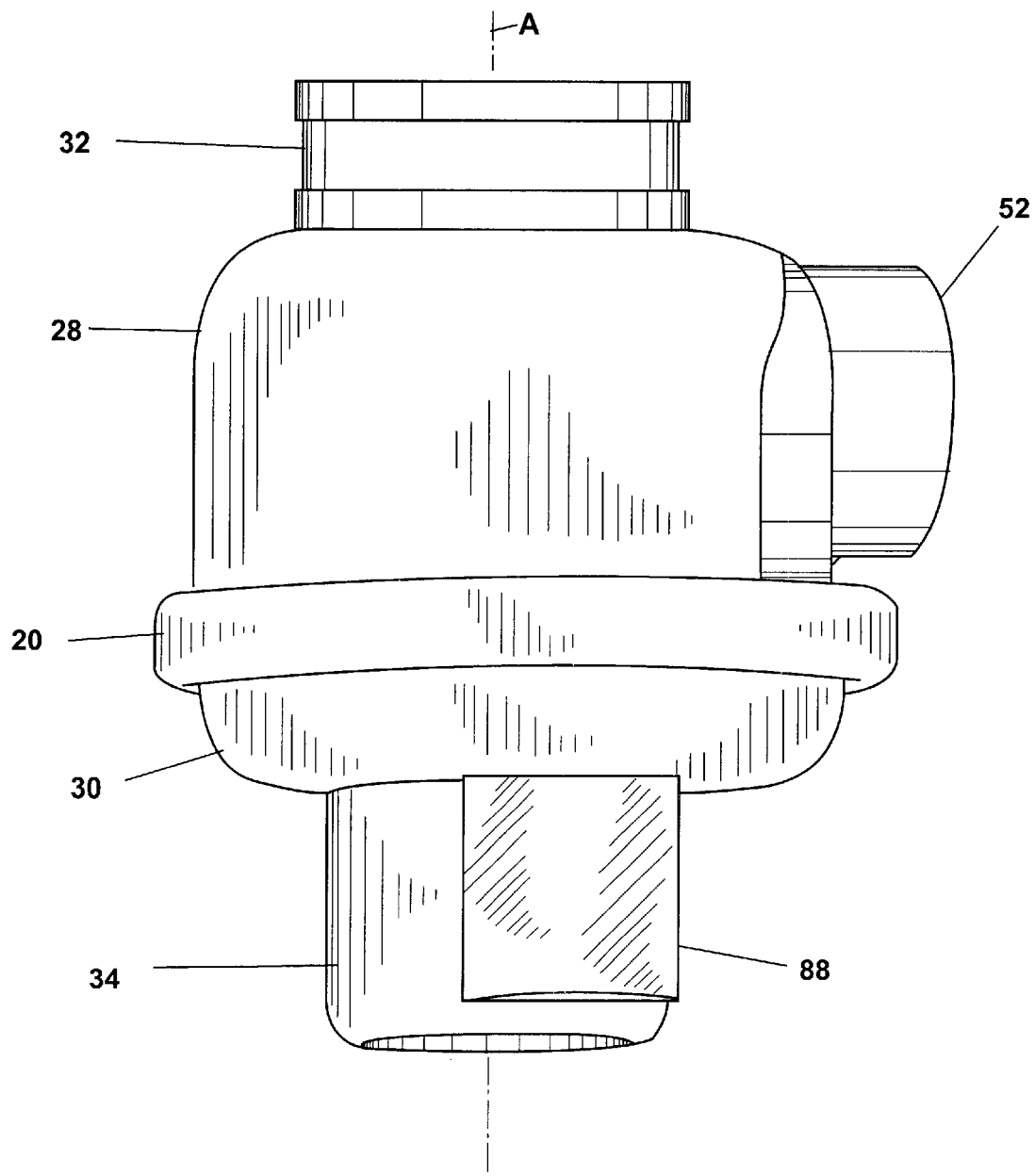
FIG. 9 is a side view of the assembled valve.
Figure 10:
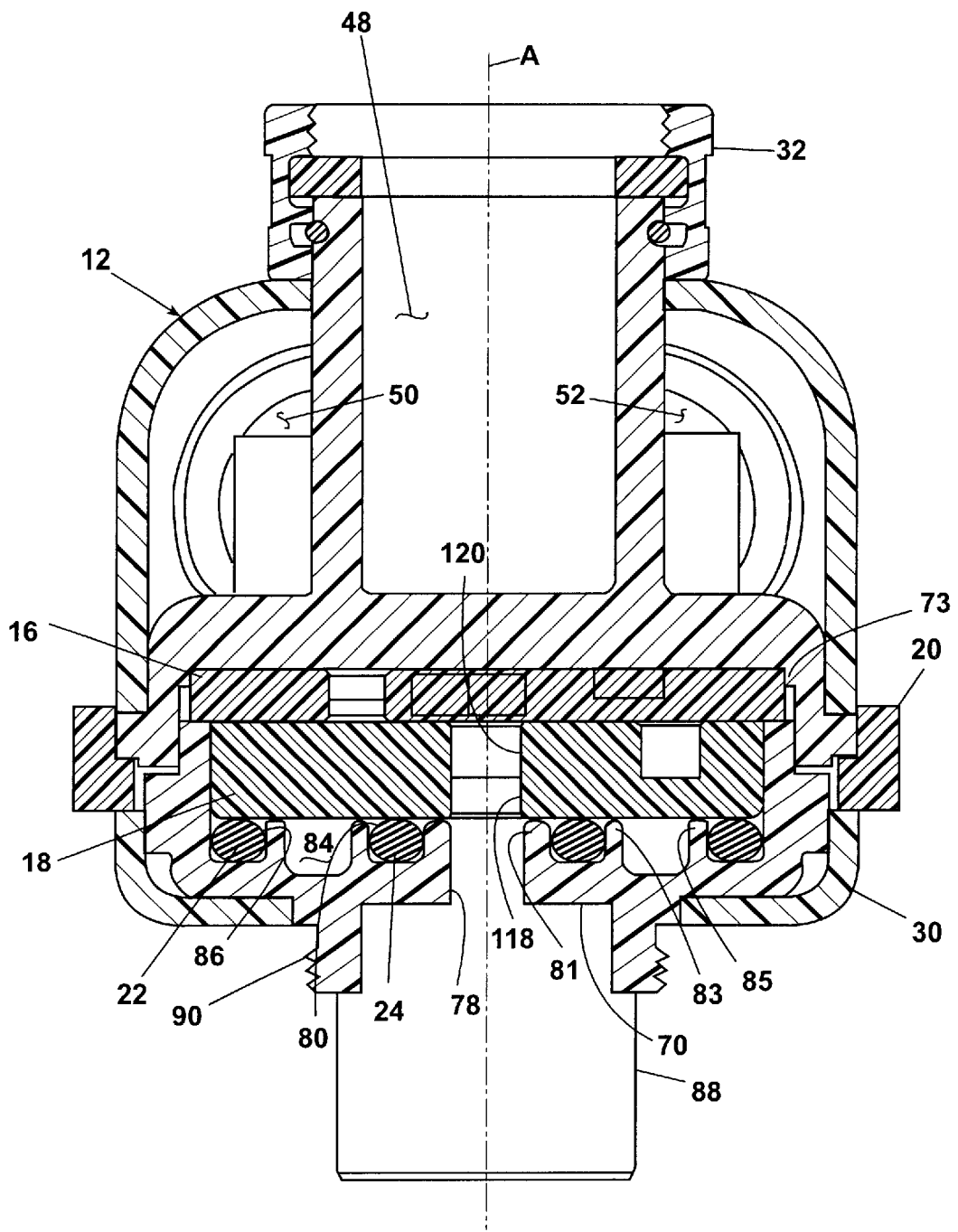
FIG. 10 is a longitudinal sectional view of the assembled valve of FIG. 9 and illustrates the independent mounting of the fixed disk.

Referring to FIGS. 1, 9 and 10, the assembly of the valve 10 will be described in detail. Initially, it should be noted that the particular sequence of the assembly as described here is only one of the many possible combinations for assembling the valve. Many of the various ways to assemble the valve are equally preferred. Therefore, the described assembly of the valve is only meant to better describe the interfitting of the various valve elements and is not meant to limit the valve assembly to the described sequence.

The assembly begins by creating a lower body portion sub-assembly. The O-rings 24, 26 are inserted into their corresponding O-ring grooves 80, 86 of the lower valve body portion 14. The rotating disk 18 is placed on the bearing formed by the upper surface of the rings 81, 83, 85 of the bottom wall 70 so that the rotating ceramic disk keys 110 lie between the notches 74 of the peripheral wall 72. The selection ring 20 is oriented so that the key holes 134 align with the keys 110 on the rotating ceramic disk and is pressed onto the lower valve body 14 so that the guide cover 76 passes through the lip 132 of the selection ring 20 and the keys 110 seat within the key holes 134. The lower valve body portion 14, rotating ceramic disk 18 and selection ring 20 can be handled as a subassembly by merely compressively holding together the lower valve body portion 14 and the selection ring 20.

Once the lower valve body portion subassembly 14 is completed, the O-rings 24, 26 are placed within the corresponding O-ring grooves 60, 62, and 64 and the upper valve body portion 12 to begin the upper valve body portion subassembly. Referring also to FIG. 2, the fixed ceramic disk 16 is oriented relative to the upper valve body portion 12 so that the key holes 94 of the fixed ceramic disk 16 align with the keys 46 of the upper valve body portion 12. The fixed ceramic disk 16 is pressed into the annular wall 42 of the upper valve body portion 12 until the keys 46 seat within the key holes 94, completing the upper valve body portion 12 subassembly.

The upper and lower valve body portion subassemblies are brought together by inserting the guide collar 76 of the lower valve body portion 14 into the interior of the annular wall 42 of the upper valve body portion 12. The guide collar 76 abuts the bottom surface of the fixed ceramic disk 16 and compressively retains the fixed ceramic disk therebetween. As the lower body 14 is interfitted with the upper body portion 12, the O-rings 24, 26 and possibly the upper surface of the lower body portion press against the lower surface of the rotating ceramic disk 18 to compress the upper surface of the rotating ceramic disk 18 against the bottom surface of the fixed ceramic disk 16 to apply the stack-up pressure between the ceramic disks. The upper and lower valve body portions 12, 14 are then sonically welded together or attached by any other suitable means.

When assembled, the valve cartridge 10 has a longitudinal axis A. The axis A preferably passes through the center point of the ceramic disks.

The height of the guide collar 76 is such that the fixed ceramic disk 16 is compressively retained between the guide collar 76 and the top wall 40 just as or slightly before the peripheral wall 72 of the lower valve body portion 14 abuts the peripheral wall 42 of the upper valve body portion. The depth of the recess 73 is substantially equal to or greater than the thickness of the rotating ceramic disk 18. The structural relationship between the collar 76 and the recess 73 permits the mounting of the fixed ceramic disk to the upper valve body portion at fixed location relative to the upper valve body portion and the axis A, while preventing the movement of the fixed disk along the axis A.

The benefit of such a fixed mounting of the fixed disk to the upper body portion such that it is not moveable relative to the axis A is that the tolerance variation attributable to the fixed disk is controlled without reliance on the biasing force of the O-ring. In other words, the tolerance variation attributable to variations in the thickness of the fixed disk is controlled by the lower body portion pressing the upper face of the fixed ceramic disk against the top wall of the upper body portion. In previous valve cartridges, the biasing force associated with the O-ring would have to compensate for the tolerance variation in both the fixed and rotation ceramic disks, which lead to higher than desired forces needed to rotate the rotating disk.

To complete the assembly of the valve 10, the collar 32 is mounted to. the upper body portion 12, which is positioned over the upper valve body portion 12 and affixed thereto preferably by sonic welding or adhesive. The lower body cover 30 is then slidably mounted over the filter nozzle 88 and collar 90 and affixed to the lower valve body portion 14, preferably sonic welding or adhesive. The nozzle 34 is positioned over the collar 90 and affixed thereto in a manner similar to the upper and lower covers 28, 30.

As best seen in FIG. 10, one important advantage of the valve cartridge 10, according to the invention, is that the valve stack-up comprises only the rotating ceramic disk 18 and the O-rings 24, 26. The fixed ceramic disk 16 is effectively taken out of the stack-up since it is compressively retained between the guide collar 76 and the lower surface of the bottom wall 40 independent of the mounting of the rotating disk. Thus, the compressive force applied by the lower body portion and O-rings to the rotating disk need only account for the tolerance variation in the rotating disk, instead of both of the fixed and rotating disk as in the prior art valve cartridges.

The compressive force applied by the O-rings is a function of the resiliency of the O-rings and the degree to which they are compressed in the mounting of the lower body portion to the upper body portion. Since the insertion of the lower body portion relative to the upper body portion is limited by the annular collar abutting the fixed disk, the axial compression of the O-rings is so limited. The biasing force associated by the axial compression is attributable to the resiliency of the material forming the O-rings. With these factors in mind, the cross-section size of the O-rings can be selected to control the amount of material to be compressed and the hardness of the material can be selected to control the force that is applied by the compressed O-ring to the rotating ceramic disk. By controlling these characteristics of the O-rings, and any other biasing element, the force applied by the O-rings against the rotating ceramic disk can be controlled, which permits control of the stack-up pressure, which is the O-ring force acting over the area of the rotating ceramic disk.

In essence, the O-rings function like a spring. The O-rings can be replaced by any other suitable biasing element, such as a spring. The O-ring is preferred because it performs the dual function of sealing the rotating ceramic disk relative to the lower body portion and applying the compressive force.

An additional advantage of the stack-up of the valve cartridge 10 is that the bearing surface, to the extent it is needed, is integrated with the lower valve body 14, effectively eliminating its tolerance losses from the stack-up. The bearing function of the valve cartridge 10 is performed by the portion of the bottom wall 70 not forming a part of the O-ring grooves 80, 86 and the filter fluid outlet channel 84. Thus, any tolerance variation attributable to the bearing does not need to be accounted for by the stack-up pressure applied by the lower body portion and the O-ring, unlike the prior art valve cartridges.

Therefore, the stack-up pressure as applied by the O-rings as they are compressed against the bottom wall 70 to seal the fixed and rotating ceramic disks 16 and 18 need only be concerned about the tolerance variances associated with the rotating ceramic disk 18 and not the combined tolerance losses of the rotating ceramic disk, fixed ceramic disk, and bearing, as in prior art valve cartridges. Moreover, since only the tolerance variation of the rotating ceramic disk need be accounted for in the stack-up pressure, the characteristics of the material for the biasing element, such as the O-ring, can be more accurately selected. Typically, these characteristics, in the case of an O-ring, are the hardness and the cross-sectional area and shape. These characteristics are selected such that the force applied to the rotating ceramic disk is such that a seal is maintained between the rotating and fixed disk. The harder (less resilient) the material and the greater the cross-sectional area the greater will be the force transferred from lower body portion to the rotating ceramic disk.

The major operational portions of the valve 10 will be described with respect to FIGS. 11–16. FIGS. 11 and 12 illustrate the relative positions of the fixed ceramic disk 16, rotating ceramic disk 18, and lower valve body portion 14 when the rotating ceramic disk 18 is in the filtered output position along with the fluid flow path through the valve 10. For illustrative purposes, FIG. 11 shows the lower valve body portion 14 and its corresponding spout opening 78, filtered output 82, and filter fluid outlet channel 84 in phantom. The water inlet pass-through opening 96, filter inlet pass-through opening 98, and filter output pass-through opening 100 of the fixed ceramic disk along with the elongated blind opening 112, filter pass-through opening 114 and arcuate blind opening 116, and fluid source through opening 118 and arcuate blind opening 120 are illustrated as solid lines even though the pass-through openings 96, 98, 100 of the fixed ceramic disk 16 are positioned above the rotating ceramic disk 18.

In the filtered output position, the rotating ceramic disk 18 is rotated counterclockwise as seen in FIG. 11 looking from the upper valve body portion 12 down to the lower valve body 14 until the keys 110 abut the peripheral wall 72. In this position, the elongated blind opening 112 of the rotating ceramic disk 18 fluidly connects the fluid source inlet pass-through opening 96 to the filter inlet pass-through opening 98, diverting the fluid supply entering the fluid inlet 48 of the upper valve body portion 12 to the filter inlet 50. The filter pass-through opening 114 and its corresponding arcuate blind opening 116 are fluidly connected to the filter pass-through opening 100 and the fixed ceramic disk 16, permitting the output from the filter to pass through the filter outlet 52, through the ceramic disks 16, 18 into the fluid channel 84 of the lower valve body 14 where the filtered output exits through the filtered output opening 82 and its corresponding filter nozzle 88.

FIGS. 13 and 14 illustrate the relative position of the fixed ceramic disk 16, rotating ceramic disk 18, and lower valve body portion 14, along with the fluid flow path through the valve cartridge 10 when the valve is in the neutral or off position. In the neutral position, the rotating ceramic disk 18 is rotated through approximately 30 degrees clockwise (as seen in FIG. 13) from the filtered output position of FIG. 11. In the neutral position, the elongated blind opening 112 is no longer in fluid communication with either the source inlet through opening 96 or filter inlet through opening 98 of the fixed ceramic disk 16, preventing the flow of fluid from the fluid source to the filter. However, the filter pass-through opening 114 and its corresponding arcuate blind opening 116 are still in fluid communication with the filter outlet pass-through opening 100 of the fixed ceramic disk 16 and the filter fluid outlet channel 84, permitting the draining of any pressurized fluid from the filter. It is important for the longevity of the the filter device, that the fluid source is shut off to the filter prior to the shutting off of the flow from the filter, which effectively permits the draining of any pressurized fluid from the filter and reducing the likelihood that a back pressure can be created in the fluid system that might adversely impact the seals of the filter and the valve.

FIGS. 15 and 16 illustrate a straight through output position of the valve cartridge 10. FIG. 15 and 16 illustrate the relationship of the fixed ceramic disk 16, rotating ceramic disk 18, and lower valve body portion 14 along with the corresponding fluid path through the valve cartridge 10. In the flow through position, the elongated blind opening 112 and filter pass-through opening 114 and its corresponding arcuate blind opening 116 are no longer in fluid communication with any pass-through openings of the fixed ceramic disk 16. However, the fluid source through opening 118 and its corresponding arcuate blind opening 120 are in fluid communication with the fluid source pass-through opening 96 with a fixed ceramic disk 16 and the spout opening 78 and the lower valve body portion 14, permitting the flow of fluid from the fluid inlet 48 through the valve cartridge 16, 18 and out through the spout opening 78 and nozzle 34.

Preferably, the rotating ceramic disk 18 rotates through approximately 60°. If the entire rotational range is thought of in terms of −30° to 30° the neutral position occurs at 0°, the filtered output at −30° and the pass-through output at 30°. The rotating ceramic disk is rotated by turning the selection ring 20.

Figure 17:
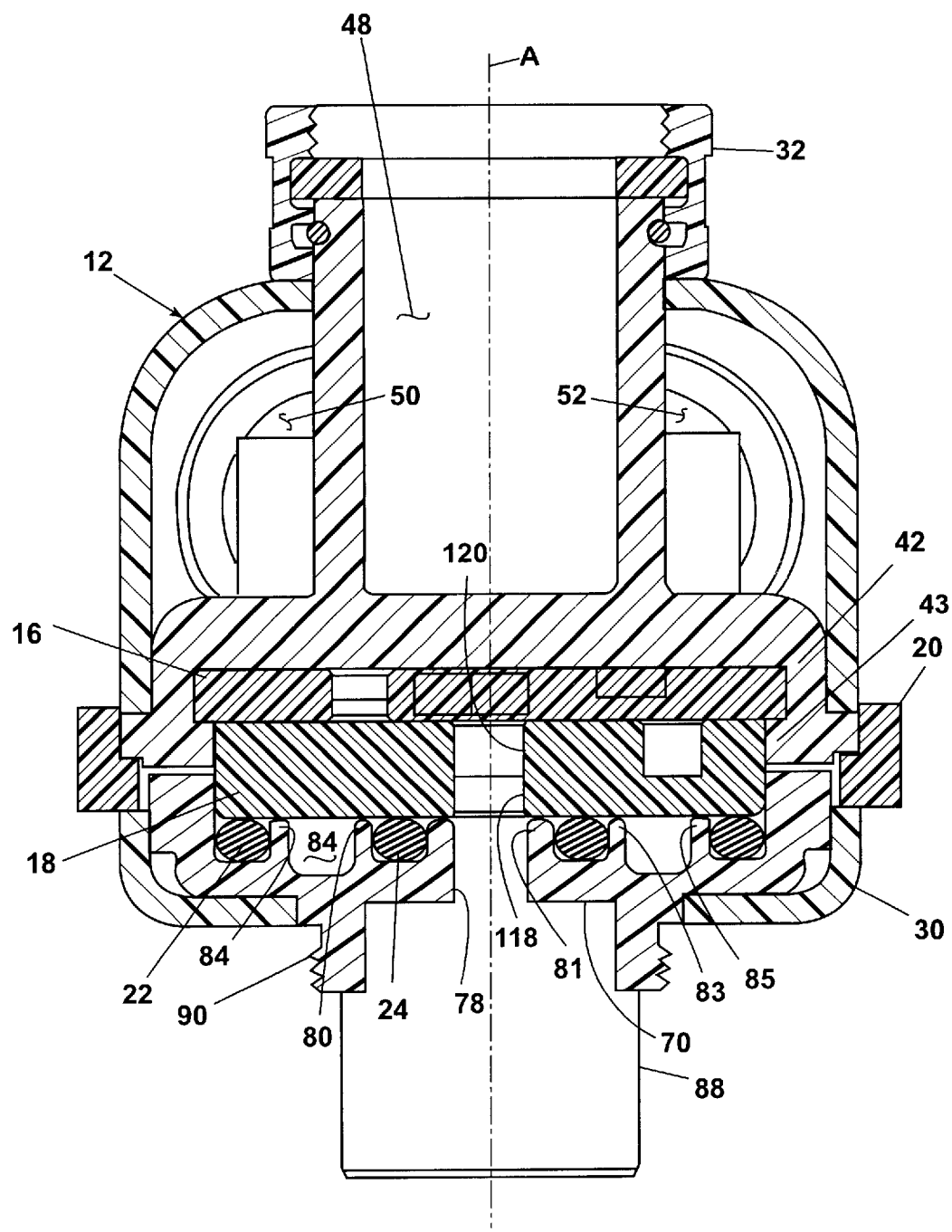
FIG. 17 is a sectional view similar to FIG. 10 of an alternative construction of the valve cartridge with the fixed disk being mounted to the upper body portion independently of the lower body portion.

FIG. 17 illustrates an alternative construction for the valve cartridge 10. The only difference between the alternative construction of FIG. 17 and the valve cartridge of FIGS. 1–16 is in the manner in which the fixed ceramic disk is mounted to the upper body portion. Therefore, like numerals will be used to identify like parts in both constructions.

In the alternative construction of FIG. 17, the upper body portion annular wall 42 comprises an inwardly directed radial lip 43 that extends over the fixed ceramic disk 16 to compressively retain the fixed ceramic disk within the recess 45. The radial lip 43 can be formed in many different ways. For example, the fixed ceramic disk can be in-molded with the upper body portion. The radial lip can be a staked or bent portion of the annular wall 42.

Since the radial lip 43 performs the function of the collar 76, the lower body portion need not have the collar 76 of the first embodiment. In all other aspects the alternative constructions are identical.

Figure 18:
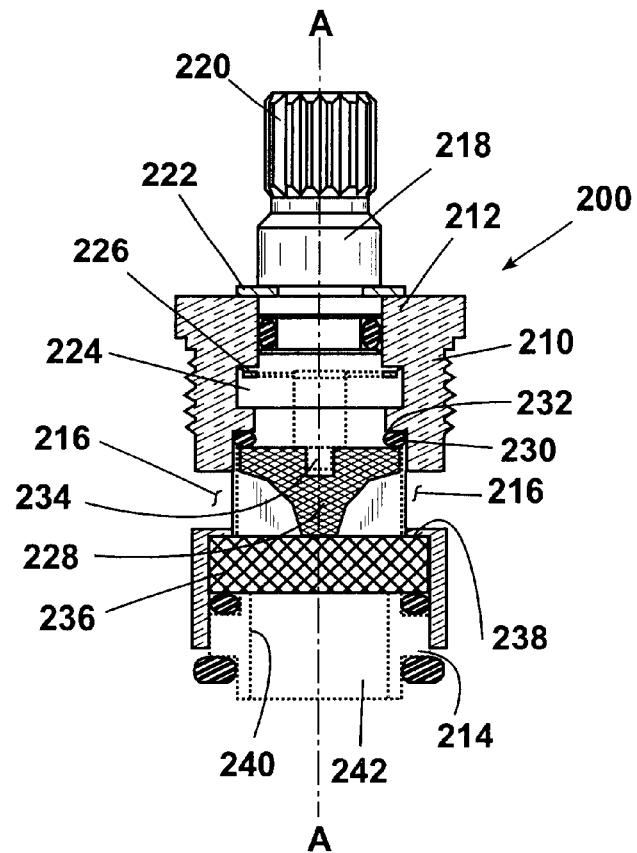
FIG. 18 is a sectional view of another embodiment of a quarter turn valve cartridge according to the invention.

FIG. 18 illustrates an application of the principles of the invention to a quarter turn ceramic valve cartridge 200. The cartridge 200 is a drop in type, designed to be installed in a conventional faucet. Also, because of its use of disks, it can be fully opened in 90° (a quarter turn), or some other predetermined range, and it is non-rising. The cartridge 200 comprises a body 210 having a first opening 212 at one end and a second opening 214 at another end. Intermediate the first and second ends are two oppositely disposed lateral openings 216. A stem 218 extends into the body 210 through the first opening 212. It comprises a conventional splined end 220 to receive a handle (not shown), and is retained in place by a spring clip 222 bearing against the outside of the body 210 and a flange 224 bearing against an internal shoulder 226 of the body 210.

A rotatable disk 228 is disposed inside the body 210 adjacent the lateral openings 216, and bears against a seal ring 230 disposed against another internal shoulder 232 of the body 210. The inner end of the stem 218 comprises a driver 234 adapted to engage the rotatable disk 228 in order to cause it to rotate as the stem is rotated.

A fixed disk 236 is disposed adjacent the rotatable disk 228, but is held in place a against a radial shoulder 238 and the body 210 by a retainer 240. In conventional manner, the fixed disk 236 has openings (not shown) through it so that when the rotatable disk 228 is rotated to a first position, a flow channel is opened through the fixed disk 236, and when the rotatable disk 228 is rotated to a second position, the flow channel is closed. The retainer 240 has an opening 242 therethrough to permit fluid flow from the source (not shown) into the cartridge 200. It will be understood that with the fixed disk 236 securely positioned between the shoulder 238 and the retainer 240, axial movement of the fixed disk 236 along the longitudinal axis A is impossible. Thus, the components comprising the stack-up consist only of the seal 230 and the rotatable disk 228.

Preferably, the rotatable disk 228 and the fixed disk 236 are ceramic. A consequence of removing the fixed disk 236 from the stack-up is that only the seal 230 and tolerance errors in the rotatable disk 228 determine the pressure in the stack-up. Thus, it is easier to control the pressure. Also, because the pressure can be more easily controlled, it is less likely that the two disks will suffer from the sticksion condition.

Figure 19:
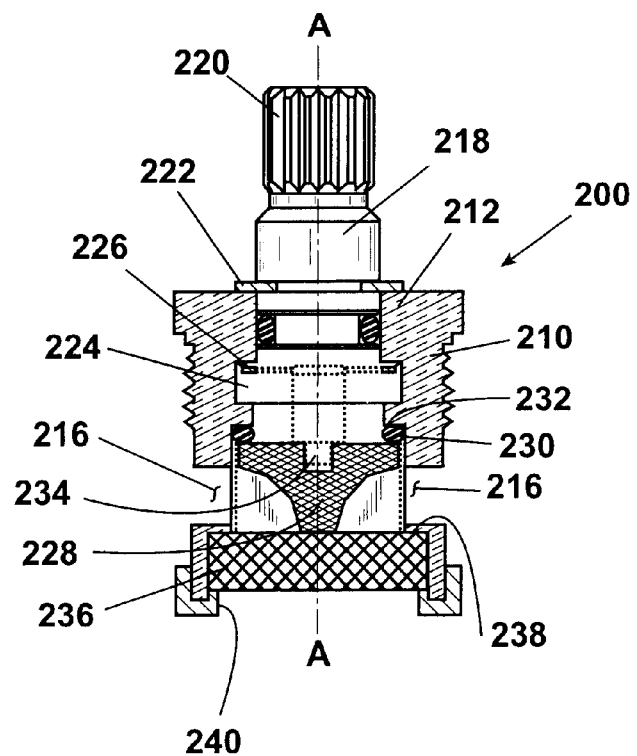
FIG. 19 is a sectional view of another embodiment of a quarter turn valve cartridge according to the invention.

FIG. 19 illustrates an alternative embodiment of the valve cartridge of FIG. 18. In this embodiment, the elements are identical except that instead of using a separate retainer, the fixed disk 236, itself, serves as the retainer, held in place by a flexible seal 240. The flexible seal 240 can have a groove that enables it to be mounted to the valve body and hold the fixed disk 236 against the shoulder 238. It is apparent that regardless of the pressure on the fixed disk exerted by the seal 240, the stack-up pressure on the stack-up elements (rotating disk 228 and O-ring seal 230) is not affected.

Figure 20:
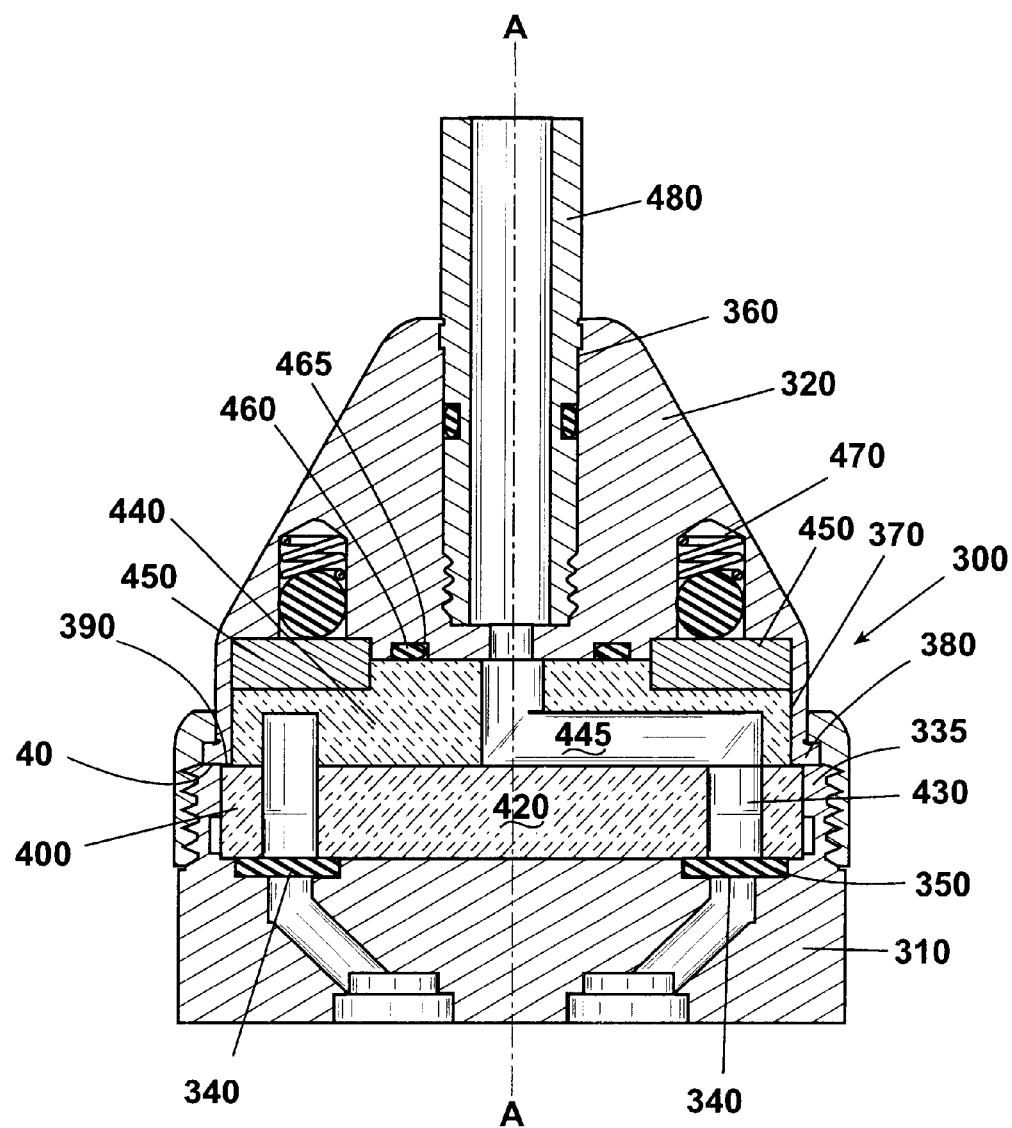
FIG. 20 is a sectional view of another embodiment of a valve according to the invention.
Figure 21:
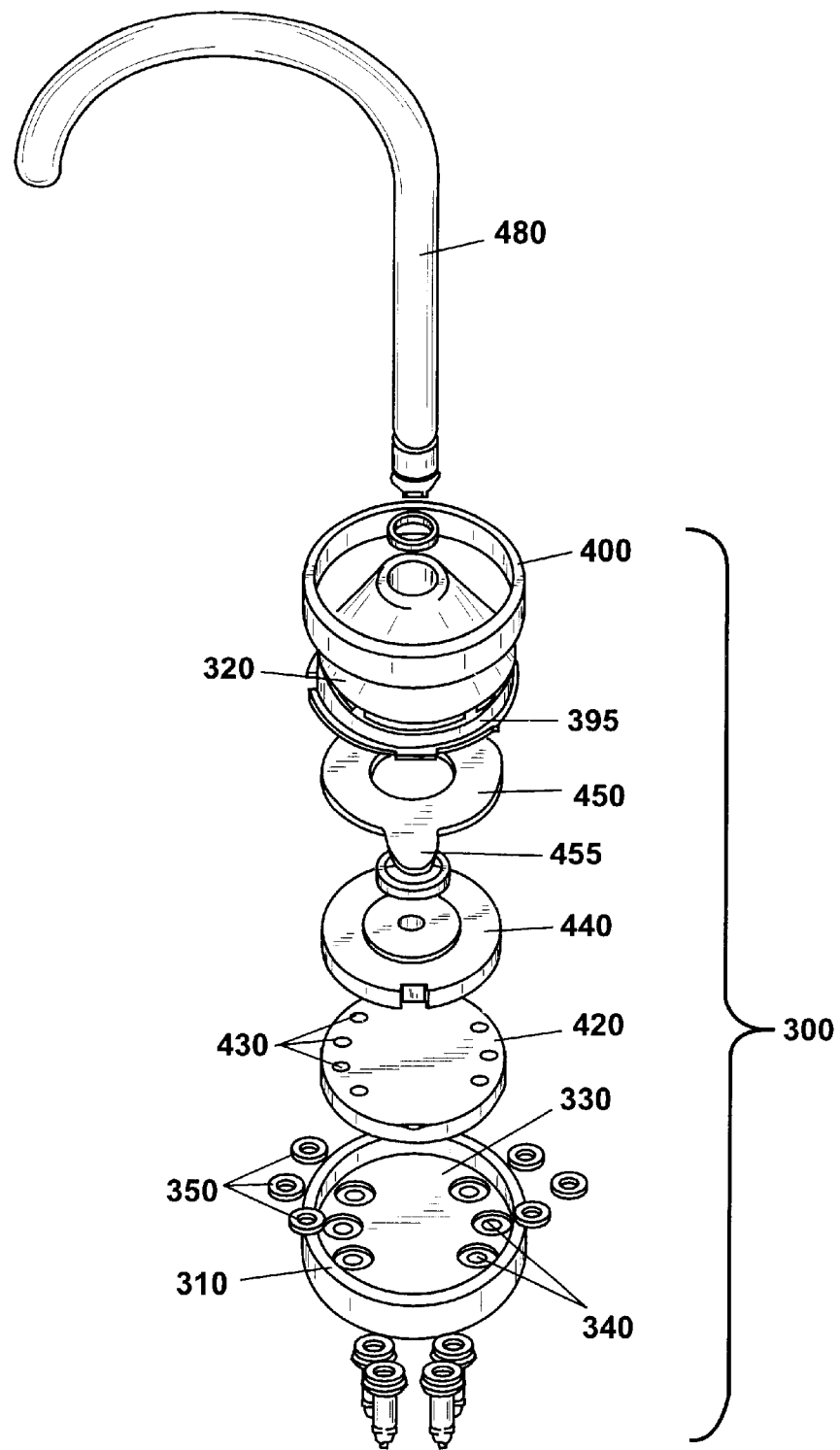
FIG. 21 is an exploded view of the valve of FIG. 20.

FIGS. 20 and 21 illustrate yet another embodiment of the invention in a valve of the type that might be used in water filtration devices or any use where multiple fluid sources must be controlled. In this embodiment, the valve body 300 comprises a lower portion 310 and an upper portion 320. The lower portion 310 has a well 330 defined by an upstanding wall 335 and a plurality of ports 340 extending through the lower portion from the well. Each port 340 is countersunk in the well to receive an O-ring seal 350. The outside of the wall 335 is threaded.

The upper portion 320 is generally cone shaped (although the exterior shape is not critical), and has a central bore 360 open to a recess 370. A mating flange 380 is sized and shaped to meet the wall 335 of the lower portion and form a shoulder 390 extending radially inward from the wall. A slot 395 open to the recess 370 extends partway around the circumference of the upper portion 320.

A coupler 400 is internally threaded and has a radial shoulder 410. When the coupler 400 is threaded over the wall 335 of the lower portion 310, the radial shoulder 410 engages the mating flange 380 of the upper portion 320 to hold it and secure it against the wall.

A fixed disk 420, preferably ceramic, has a plurality of pass-through openings 430 disposed to match the locations of the respective ports 340. The fixed ceramic disk 420 rests in the recess 330 of the lower portion 310 with the pass-through openings 430 in registry with the ports 340. It is held securely in place between the bottom of the recess 330 and the shoulder 380.

A rotating disk 440, preferably ceramic, has at least one aperture 445 therethrough, adapted to fluidly connect the pass-through apertures 430 with the central bore 360. The rotating disk 440 is disposed in facing relationship with the fixed disk 420 within the recess 370 of the upper portion 320 and is rotatable relative thereto. A turning handle 450 is keyed to the rotating disk 440 and has a projection 455 that is adapted to extend through the slot 395 so that a person can rotate the disk 440 by urging the projection 455 to move one way or the other in the slot 395. An O-ring seal 460 in a groove 46S in the upper portion 320 seals the rotatable disk 440 and biases it against the fixed disk 420. A biasing element 470 such as a cup spring maintains the handle 450 in keyed relationship to the rotating disk 440.

A spout 480 is disposed in the central bore 360 and sealed against leakage to direct fluid out of the valve body 300. It will be apparent that the stack-up elements comprise essentially the rotating disk 440 and the O-ring seal 460. This reduction in the number of elements comprising the stack-up reduces the impact that tolerance errors in the fixed disk might otherwise have on the stack-up pressure because the fixed disk 420 is axially immovable. In fact, if the lower portion can be made so as to enable a fluid-tight interface with the rotating disk, there would be no need for a separate fixed disk.

It will be understood that the principles of the invention are equally applicable to other embodiments of valve cartridges incorporating a fixed disk and a rotatable disk where the stack-up pressure is important. For example, an in line valve where the fluid flow is axial through the valve and the rotatable disk is controlled by a radially extending stem can benefit from the invention by securing the fixed disk to the valve body apart from the stack-up incorporating the rotatable disk. Conversely, it will be understood that the rotatable disk can be secured against axial movement in the stack-up and the fixed disk can be the one in the stack-up.

While the invention has been specifically described in connection with certain specific embodiments thereof, it is to be understood that this is by way of illustration and not of limitation, and the scope of the appended claims should be construed as broadly as the prior art will permit.

What is claimed is:

1. A valve for controlling the flow of fluid from a fluid source to a fluid outlet, the valve comprising:
   a valve body having a longitudinal axis;
   a first disk mounted to the valve body on the longitudinal axis such that the first disk is axially and radially immovable relative to the valve body;
   a second disk mounted to the valve body on the longitudinal axis and maintained in an axially facing relationship with the first disk, wherein the second disk is rotatable relative to the valve body and to the first disk;
   each of the first and second disks being configured to permit fluid flow through the valve body when the second disk is in a first position relative to the first disk, and to bar fluid flow through the valve body when the second disk is in a second position relative to the first disk; and
   a biasing element disposed between the valve body and the second disk to bias the second disk against the first disk along the longitudinal axis.

2. A valve according to claim 1, wherein the valve body has a first annular shoulder and the first disk is held against the first annular shoulder by a retainer.

3. A valve according to claim 1, wherein the valve body has a first annular shoulder and the first disk is secured against the first annular shoulder.

4. A valve according to claim 3, wherein the valve body has a second annular shoulder and the biasing element bears against the second annular shoulder.

5. A valve according to claim 4, wherein the biasing element is a resilient seal.

6. A valve according to claim 5, wherein the resilient seal is an O-ring.

7. A valve according to claim 6, further comprising a stem extending into the valve body and operably connected to the rotatable disk to effect selective rotation of the second disk relative to the first disk.

8. A valve according to claim 7, wherein the stem extends axially from the valve body.

9. A valve according to claim 7, wherein the stem extends radially from the valve body.

10. A valve according to claim 1, wherein the disks are ceramic.

11. A valve according to claim 5, wherein the hardness and size of the resilient seal is selected to control the biasing force applied to the second disk.

12. A valve according to claim 1, wherein the first disk is disposed at a fixed position on the longitudinal axis independent of the position of the second disk on the longitudinal axis.

13. In a valve cartridge comprising a valve body having a first ceramic disk and a second ceramic disk in facing relationship, the first ceramic disk being mounted to the valve body in a manner to prohibit rotatable movement and the second ceramic disk being mounted to the valve body in a manner to permit rotatable movement relative to the valve body and to the first ceramic disk, the improvement wherein:
   the first ceramic disk is fixed in the valve body to prohibit axial movement of the first ceramic disk relative to the valve body and to the second ceramic disk.

14. The improvement according to claim 13 wherein the valve body has a first annular shoulder and the first disk is held against the first annular shoulder by a retainer.

15. The improvement according to claim 13, wherein the valve body has a first annular shoulder and the first disk is secured against the first annular shoulder.

* * * * *